United States Patent
Stolte et al.

(10) Patent No.: US 8,925,865 B2
(45) Date of Patent: Jan. 6, 2015

(54) EMERGENCY SUPPLY SYSTEM FOR A TRANSPORTATION MEANS, METHOD FOR SUPPLYING ELECTRICAL POWER AND FOR INHIBITING FIRE AND AIRCRAFT WITH AN EMERGENCY SUPPLY SYSTEM

(71) Applicant: Airbus Operations GMBH, Hamburg (DE)

(72) Inventors: Ralf-Henning Stolte, Hamburg (DE); Gwenaelle Renouard Vallet, Hamburg (DE); Paul Rohrbach, Bremen (DE); Rainer Beuermann, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 148 days.

(21) Appl. No.: 13/757,089

(22) Filed: Feb. 1, 2013

(65) Prior Publication Data

US 2013/0206910 A1    Aug. 15, 2013

Related U.S. Application Data

(60) Provisional application No. 61/594,501, filed on Feb. 3, 2012.

(30) Foreign Application Priority Data

Feb. 3, 2012    (DE) .......................... 10 2012 002 131

(51) Int. Cl.
| | |
|---|---|
| *B64D 45/00* | (2006.01) |
| *B64D 25/00* | (2006.01) |
| *A62C 3/08* | (2006.01) |
| *A62C 35/13* | (2006.01) |
| *H01M 8/04* | (2006.01) |

(52) U.S. Cl.
CPC . *B64D 25/00* (2013.01); *A62C 3/08* (2013.01); *A62C 35/13* (2013.01); *H01M 8/04089* (2013.01); *H01M 8/04753* (2013.01); *H01M 2250/20* (2013.01); *Y02E 60/50* (2013.01); *Y02T 90/32* (2013.01)
USPC ............... 244/129.2; 244/58; 169/56; 169/46

(58) Field of Classification Search
USPC ......... 244/129.2, 58, 136; 169/56, 46, 62, 60, 169/9, 11
See application file for complete search history.

(56) References Cited

U.S. PATENT DOCUMENTS

| | | | |
|---|---|---|---|
| 6,676,081 B2 * | 1/2004 | Grabow et al. ............. | 244/129.2 |
| 2003/0233936 A1 * | 12/2003 | Crome .............................. | 95/96 |

(Continued)

FOREIGN PATENT DOCUMENTS

| | | |
|---|---|---|
| DE | 102005053694 B3 | 1/2007 |
| DE | 102010025054 A1 | 12/2011 |

OTHER PUBLICATIONS

German Patent Office, German Search Report dated Oct. 15, 2012 for German Application No. 10 2012 002 131.3.

(Continued)

*Primary Examiner* — Christopher P Ellis
*Assistant Examiner* — Medhat Badawi
(74) *Attorney, Agent, or Firm* — Ingrassia Fisher & Lorenz, P.C.

(57) ABSTRACT

An emergency supply system for a transportation means is provided. The system includes at least one fuel cell, a hydrogen tank, an oxygen tank, an extinguishing agent container, an oxidant supply unit and an extinguishing-agent supply unit. The oxidant supply unit includes an oxygen inlet connectable to the oxygen tank, an air inlet connectable to an air source, and an oxidant outlet connected to an oxidant inlet of the fuel cell. The oxidant supply unit either conveys oxygen from the oxygen inlet or air from the air inlet to the oxidant outlet. The extinguishing-agent supply unit includes a first extinguishing agent inlet connected to an exhaust air outlet of the fuel cell, a second extinguishing agent inlet connected to the extinguishing agent container, and an extinguishing agent outlet that is connectable to an extinguishing-agent inlet unit of at least one space of the transportation means.

20 Claims, 5 Drawing Sheets

(56) References Cited

U.S. PATENT DOCUMENTS

| | | | |
|---|---|---|---|
| 2008/0210812 A1* | 9/2008 | Gans et al. | 244/58 |
| 2009/0126949 A1* | 5/2009 | Wagner | 169/46 |
| 2012/0318921 A1* | 12/2012 | Rohrbach et al. | 244/129.2 |
| 2013/0206910 A1* | 8/2013 | Stolte et al. | 244/129.2 |
| 2014/0087283 A1* | 3/2014 | Stolte et al. | 429/435 |

OTHER PUBLICATIONS

European Patent Office, Extended European Search Report for European Patent Application No. 13153542.9, mailed Mar. 19, 2013.

European Patent Office, Office Action for European Patent Application No. 13153542.9, mailed Oct. 29, 2014.

* cited by examiner

EMERGENCY SUPPLY SYSTEM FOR A TRANSPORTATION MEANS, METHOD FOR SUPPLYING ELECTRICAL POWER AND FOR INHIBITING FIRE AND AIRCRAFT WITH AN EMERGENCY SUPPLY SYSTEM

CROSS-REFERENCE TO RELATED APPLICATIONS

This application claims priority to German Patent Application No. 10 2012 002 131.3, filed Feb. 3, 2012 and to U.S. Provisional Patent Application No. 61/594,501, filed Feb. 3, 2012, which are incorporated herein by reference in their entirety.

TECHNICAL FIELD

The technical field relates to an emergency supply system for an aircraft, to a method for supplying electrical power and for inhibiting fire, and to an aircraft.

BACKGROUND

Larger commercial aircraft comprise a number of different systems which according to the criticality of the functions provided by them are designed so as to be more or less redundant. Furthermore, systems are provided which in an emergency ensure, for example, the oxygen supply to passengers, or retarding or extinguishing fire in a closed-off space of the aircraft.

Providing a continuous electricity supply on board an aircraft is, for example, so elementary that very high reliability is achieved by combining several electricity supply systems. Apart from the operation of engine-driven generators, present-day aircraft comprise a ram-air-driven turbine (so called ram air turbine, RAT) for emergency use, which turbine may either provide hydraulic power and, by way of a hydraulic circuit, drive a generator, or may drive a generator directly. A ram air turbine is frequently arranged in the region of a wing-fuselage fairing, and in the case of an emergency is hinged out from a closable compartment into the airflow. During airworthiness certification flights it is often observed that turbine blades of the ram air turbine may be damaged as a result of impact by stones. Furthermore, the performance of the ram air turbine generally depends on the flight speed, and consequently in the case of approaches to land, if engine generators are unable to supply enough electrical power it may be necessary to also use a battery. In the final analysis this creates a substantial maintenance potential that clearly results in increased costs.

As an alternative, furthermore, in the context of modern commercial aircraft there are concepts relating to fuel cell systems in which exclusively from dedicated tanks oxygen and hydrogen are supplied independently of any engines. DE 10 2005 010 399 B4 shows an aircraft with a fuel cell system that is not dependent on external air, which fuel cell system comprises a fuel cell, a hydrogen tank, an oxygen tank and a power distribution unit, with fuel cell system remaining inactive during normal operation.

In order to adequately confront a fire or a fire hazard in the aircraft, commercial aircraft usually comprise a halon-based fire extinguishing system. If a fire in the cargo compartment is detected, halon is introduced into said cargo compartment, which results in suppression of the fire and prevention of the fire until the end of the flight mission. During this time the leakage from the cargo compartment needs to be picked up by the fire suppression system, in extended flight missions by flow metering bottles which ensure that whatever is lost as a result of leakage is compensated for. DE 10 2010 025 054 A1 discloses, for example, a fire extinguishing system for an aircraft, which fire extinguishing system comprises an extinguishing-agent storage device with a closure device that can be activated. Halon, for example halon 1301, is effective for extinguishing/inhibiting fires. Due to its classification as a substance that has a negative effect on the climate, and a substance that depletes the ozone layer, the production of halon 1301 is prohibited by the Montreal Protocol.

As an alternative to this, concepts exists wherein exhaust air from fuel cells is used for the inertization of a space in a transportation means, and for inhibiting minor fires. DE 10 2005 053 694 describes, for example, a fuel cell system for extinguishing fires in an aircraft, wherein the fuel cell is used to generate nitrogen-enriched air.

In addition, other objects, desirable features and characteristics will become apparent from the subsequent summary and detailed description, and the appended claims, taken in conjunction with the accompanying drawings and this background.

SUMMARY

The ability to fight fires on board transportation a means with the use of oxygen-depleted air in the form of fuel-cell exhaust air depends, in one example, on the size of the space and on the output of the fuel cell used. In the case of a large cargo compartment of an aircraft, it might be rather impractical to exclusively depend on the fire-extinguishing effect of oxygen-depleted air from a fuel cell. The quantities of oxygen-depleted air necessary to be introduced to build up the required protective atmosphere within one to two minutes in the cargo compartment may not economically be generated by a fuel cell system. The fuel cell would have to have a considerable nominal output in order to quickly generate an adequate quantity of exhaust air in the first minutes. For this reason a fuel cell system is primarily used for the long-term suppression of fires.

According to various exemplary embodiments, provided is an emergency supply system for a transportation means, which emergency supply system makes it possible to reliably retard or extinguish fire in a space within the fuselage of the transportation means, wherein the emergency supply system adds as little additional weight as possible and does so without the use of halon.

In one exemplary embodiment the emergency supply system comprises at least one fuel cell, a hydrogen tank, an oxygen tank, an extinguishing agent container, an oxidant supply unit and an extinguishing-agent supply unit. The oxidant supply unit comprises an oxygen inlet that is connectable to the oxygen tank, an air inlet that is connectable to an air source, and an oxidant outlet that is connected to an oxidant inlet of the fuel cell. The oxidant supply unit is adapted in a first operating mode of the emergency supply system as an emergency power generator for conveying oxygen from the oxygen inlet, and in a second operating mode as a fire extinguishing device for conveying air from the air inlet to the oxidant outlet. The extinguishing-agent supply unit comprises a first extinguishing agent inlet, a second extinguishing agent inlet connected to the extinguishing agent container, and at least one extinguishing agent outlet that is connectable to an extinguishing agent inlet of at least one space of the transportation means. The extinguishing-agent supply unit is adapted in the first operating mode for connecting the exhaust air outlet of the at least one fuel cell exclusively to an outlet opening, and in the second operating mode exclusively to the first extinguishing agent inlet.

The emergency supply system according to the various teachings of the present disclosure provides an advantage in that by means of a fuel cell both an emergency electricity supply and by means of largely inert exhaust air, generated in a fuel cell process, in combination with an additional extinguishing agent a fire extinguishing device or fire suppression device can be provided, and by combining these functions significant weight can be saved. In order to supply the fuel cell with the educts necessary for operation the oxidant supply unit is connected to an oxidant inlet of the fuel cell and receives either oxygen or air. In addition, an exhaust air outlet of the fuel cell is connected to the extinguishing-agent supply unit in order to either remove the arising products of the fuel cell from the transportation means or to use them for inhibiting a fire. Accordingly, the emergency supply system comprises two fundamentally different operating modes that are explained in detail below.

In the case of a reduced capacity of engines or engine generators, for example if the transportation means is an aircraft flying through a cloud of volcanic ash and needs to initiate an "engine relight maneuver", correspondingly the fuel cell may be operated in order to provide adequate electrical output for operating the most important systems. This represents the first operating mode. In this mode for autarchic operation a supply of oxygen and hydrogen from dedicated tanks must be realized because in the case of an emergency it cannot be assumed that an alternative air source is available. Because the system is operated with pure oxygen, only pure water results, which, for example, can be removed from on board the transportation means by way of an outlet opening.

If within a space of the transportation means, which space is to be protected, smoke or fire is detected, the emergency supply system is switched to a second operating mode so that a fuel cell is operated which apart from electrical power also provides a largely oxygen-depleted exhaust air. In this arrangement the oxygen supply is ensured with air from the air source, which air usually comprises about 78% nitrogen and about 21% oxygen. After passing through the fuel cell process, exhaust air at a significantly reduced oxygen content is supplied so that from the point of view of its fire extinguishing effect the exhaust air comes very close to an inert gas. In one example, if the transportation means is an aircraft, bleed air may be used as an air source. Furthermore, an air-conditioned cabin of the transportation means requires a constant air exchange, wherein the air removed from the cabin is also suitable for operating the fuel cell. The extinguishing-agent supply unit takes up this exhaust air and may introduce it as an extinguishing agent to a space located in the transportation means. During the startup phase of the fuel cell and during its normal operation, in principle the extinguishing-agent supply unit may use both exhaust air from the fuel cell and an additional extinguishing agent from an extinguishing agent container.

For protecting the fuel cell, the air from the air source, which air is used for the fuel cell, needs to be correspondingly conditioned so that a moderate pressure, a moderate temperature, and a necessary purity are present. In an aircraft the pressure could, for example, be approximately 1 bar. Furthermore, an air mass flow generated from the aforesaid also needs to satisfy a necessary reliability requirement of a fire extinguishing system or fire suppression system.

In one example, the extinguishing-agent supply unit comprises at least one extinguishing-agent valve, which is controllable from the outside, which extinguishing-agent valve allows an extinguishing-agent flow in the form of exhaust air of the fuel cell, of the extinguishing agent from the extinguishing agent container or of both substances together at the at least one extinguishing agent outlet. For immediately extinguishing an acute fire in a cargo compartment, for example, either a high volume flow of oxygen-depleted exhaust air from the fuel cell or a high volume flow of the alternative extinguishing agent could be supplied to the cargo compartment, or as an alternative to the aforesaid a mixture of the two substances, wherein the partial volume flows can then in each case be lower. Such a concept, in which by means of support during startup of the fuel cell already a high volume flow of an extinguishing agent is immediately provided, can be referred to as a "knock-down system". For controlling the danger of a fire, the respective space can be inertized, wherein then a high, medium or low volume flow of oxygen-depleted air can be sufficient, depending on the size and tightness of the space and the likelihood of a fire arising. Such a concept can be referred to as an "inerting system".

The arising electrical power, which is generated during inertization or fire extinguishing of a cargo compartment, for the purpose of easing the burden on engine generators may be supplied to an electrical network, can be used for charging a battery, or can be supplied to a blind load.

The two different operating modes thus require the switchover of an oxygen supply between a pure oxygen supply with oxygen from an oxygen tank for providing emergency power in the case of failure of primary power sources and an air-based oxygen supply for providing an inert gas for extinguishing fires or for the inertization of spaces in the transportation means.

Designing the fuel cell should, in one example, take place in such a manner that in any case the required nominal output as an emergency power generator is achieved. In the table set out below, different design concepts are shown. If a "knock-down" function is used as a fire extinguishing device, a high initial volume flow of exhaust air from a fuel cell is necessary if no alternative extinguishing agent is used (concept I). If the nominal output of the fuel cell as an emergency power generator is adequate, the fuel cell could provide such a volume flow. If said nominal output is inadequate, by means of a combination with an alternative extinguishing agent the required volume flow may be reduced to a moderate level (concept III). However, if the necessary nominal output of the fuel cell for operation as an emergency power generator is of such a magnitude that would allow a high or moderate volume flow of exhaust air only by means of considerable over-dimensioning, according to concept II a knock-down function may be implemented exclusively by means of the alternative extinguishing agent. The required volume flow for inertization of a space, for example to compensate for the loss of extinguishing agent as a result of leakage, is quite small; it could, for example, be between about 20 and about 30 l/s in the case of the cargo compartments of an aircraft of the type AIRBUS A320.

|  | Knock-down | Inertization |
| --- | --- | --- |
| I | Exhaust air | Exhaust air |
| II | Extinguishing agent | Exhaust air |
| III | Extinguishing agent + exhaust air | Exhaust air |
|  | High and middle volume flow | Low volume flow |

In one exemplary embodiment the air inlet of the at least one oxidant supply unit is connected to a cabin exhaust-air connection of the transportation means. As mentioned above, part of the cabin air needs to be removed from the aircraft anyway in order to maintain continuous air quality. This air that nevertheless contains adequate oxygen can be used to operate the at least one fuel cell.

In one exemplary embodiment the air inlet of the oxidant supply unit is connected to at least one bleed air source of the transportation means. In order to protect the fuel cell it is necessary to use a bleed air source that provides air at a moderate temperature and at a moderate pressure. It thus makes sense to use a bleed air source with pre-cooled bleed air.

In one exemplary embodiment the air inlet of the oxidant supply unit is connected to a fresh-air supply line of an air conditioning system of the transportation means. A cabin air connection may also be a pipe in a triangular region, may branch off from a recirculation pipe, or may be implemented by means of a fan that conveys cabin air to it. If required, compressors are to be used in order to achieve a useful level of pressure for the fuel cell. In this manner, moderately temperature-controlled and conditioned fresh air for optimum operation of the fuel cell is provided.

In one exemplary embodiment a control unit is provided that is connected to the at least one fuel cell, to the oxidant supply unit and to the extinguishing-agent supply unit. The control unit is designed when receiving a signal to immediately initiate operation of the at least one fuel cell and to initiate the connections necessary for the respective operating state of the oxidant supply unit and of the extinguishing-agent supply unit. The signal may, for example, originate from a fire detector or a smoke detector that is arranged in the cargo compartment to be monitored. As an alternative, the signal may also be initiated by way of a switch from the cockpit of the transportation means, for example by a pilot after receipt of a visual or acoustic alarm.

In one exemplary embodiment the control unit is adapted in the second operating mode for immediately causing a first quantity of an extinguishing agent by way of the extinguishing-agent supply unit to flow from the extinguishing agent container to the extinguishing agent outlet so as to quickly suffocate a fire. In this manner, for example, the cargo compartment may to the greatest possible extent be filled with an extinguishing agent, for example halon 1301, carbon dioxide, argon or nitrogen, wherein by the subsequent introduction of oxygen-depleted exhaust air from the fuel cell any leakage and/or layering, as a result of gravity, of the extinguishing agent is compensated for in order to maintain an inert atmosphere.

In one exemplary embodiment a compressor is arranged on the air inlet of the oxidant supply unit for compressing air from the air source. If air is removed from a cabin or some other space within the transportation means, the pressure used for the fuel cell may be increased by the compressor.

In one exemplary embodiment, furthermore a water source is provided which is connected to a nebulizing apparatus, wherein the nebulizing apparatus is designed to convey nebulized water into the space of the transportation means. The control unit is, for example, adapted after receipt of a corresponding signal for operating the nebulizing apparatus and for providing it through the extinguishing-agent flow from the extinguishing agent outlet. In this manner it is possible to achieve outstanding cooling, wherein with the use of oxygen-depleted air or some other gaseous extinguishing agent for introducing the nebulized water at the same time suffocating the fire also takes place.

In one exemplary embodiment the nebulizing apparatus is connected to a propellant gas tank for introducing propellant gas for nebulizing water. Thus in a simple manner very effective water nebulizing may be generated for an adequate period of time without this requiring an excessively large propellant tank. In this arrangement the nebulizing apparatus may, for example, be arranged directly in the space. In the case of several spaces in the transportation means it would also be possible to provide several units of nebulizing apparatus, each comprising a water tank and a propellant gas tank.

In one exemplary embodiment the nebulizing apparatus is connected to the at least one extinguishing agent outlet for introducing gaseous extinguishing agent for nebulizing water. Accordingly, the nebulized water may be generated without any additional propellant gas.

In one exemplary embodiment the nebulizing apparatus supplies nebulized water between the at least one extinguishing agent outlet and the at least one extinguishing agent inlet of a space to an extinguishing agent pipe. In this manner water is nebulized centrally also for use in several spaces.

In one exemplary embodiment a buffer storage device is arranged on the exhaust air outlet of the at least one fuel cell so that oxygen-depleted exhaust air generated at that location can be stored in the buffer storage device. This makes sense for example, in cases where prior to the introduction of the oxygen-depleted exhaust air from the fuel cell into the respective space of the transportation means extinguishing or inhibiting a fire takes place by means of some other extinguishing agent. In this concept the extinguishing-agent supply unit is advantageously first set to conveying extinguishing agent from the extinguishing agent tank to the space, while the exhaust air generated in the fuel cell, which fuel cell is already in operation, is exclusively conveyed to the buffer storage device. When the introduction of the extinguishing agent into the space is finished, the extinguishing-agent supply unit may be switched over to conveying oxygen-depleted exhaust air in order to then primarily empty the already partly-filled buffer storage device into the space. This ensures a continuous volume flow, and the speed at which an extinguishing operation is carried out is increased.

In one exemplary embodiment the extinguishing-agent supply unit is adapted at the same time for conveying the extinguishing agent from the extinguishing agent tank and to convey oxygen-depleted air from the exhaust air outlet of the at least one fuel cell into the space. In this manner it is also possible to achieve an increased volume flow, and fighting the fire or inertization of the respective space may be accelerated.

The present disclosure furthermore relates to a transportation means with a fuselage, to at least one space formed therein, and to an emergency supply system as described above.

The present disclosure furthermore relates to a method for providing electrical power and for inhibiting fire in a transportation means, in which method an emergency supply system with a fuel cell is switchable into one of two operating states, wherein the first operating state is intended to provide electrical power and substantially involves switching-over an oxidant supply unit for supplying the fuel cell with oxygen from an oxygen tank, connecting the fuel cell to an outlet opening of the transportation means, and starting the fuel cell. The second operating state is intended for inhibiting a fire in a space of the transportation means and substantially involves switching-over an oxidant supply unit for supplying the fuel cell with air from an air source, connecting an extinguishing agent inlet to an exhaust air outlet of the fuel cell, starting the fuel cell, and introducing inert exhaust air into the space.

All the processes shown above, which have been described by means of the components provided according to the present disclosure, are to be considered to be optional characteristics of the method. This includes the initial filling of a space with some alternative extinguishing agent, the provision of electrical power to one or several electrical networks or blind loads, the compression of air, the storage of oxygen-depleted exhaust air in a buffer storage device, the concurrent, alternating or gradual distribution of extinguishing agent to several spaces, and all the remaining processes.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
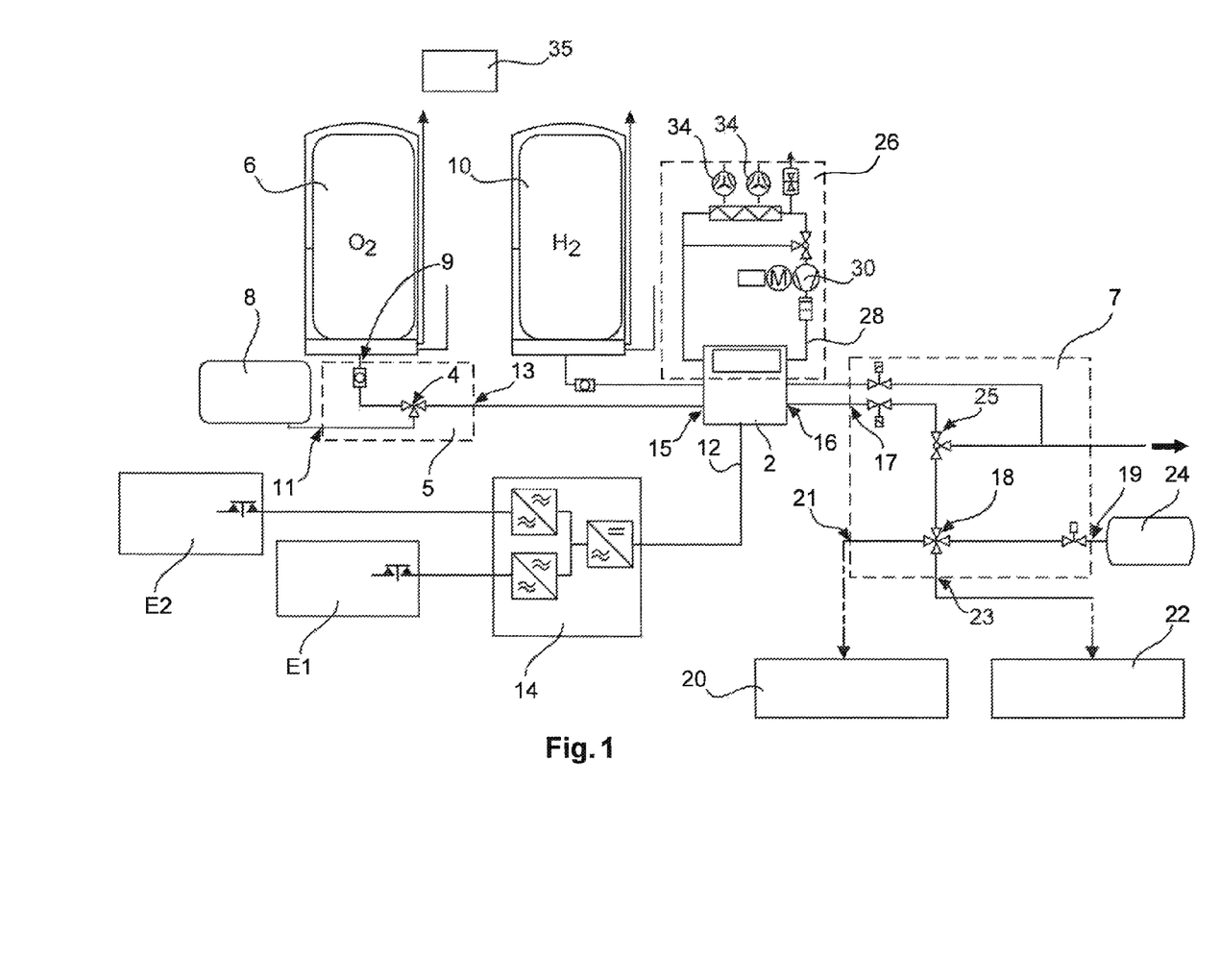
FIG. 1 shows a diagrammatic view of the emergency supply system.

FIG. 1 shows a diagrammatic view of an emergency supply system comprising a fuel cell 2 implemented as a single fuel cell or as one or several fuel cell stacks. In order to supply the fuel cell 2 with the educts necessary for the fuel cell process, an oxidant supply unit 5 is provided which in the case shown is designed with a valve 4, hereinafter referred to as the "oxygen supply valve". An oxygen inlet 9 is connected to an oxygen tank 6, and an air inlet 11 is connected to an air source 8. Depending on the position of the oxygen supply valve 4, oxygen or air is provided at an oxidant outlet 13 and is conveyed to an oxidant inlet 15 of the fuel cell 2. For supplying the fuel cell 2 with hydrogen, furthermore, a hydrogen tank 10 is provided. While an oxygen tank 6 is usually designed as a pressure reservoir, the hydrogen tank 10 is in one example, of a cryogenic design. With a manageable nominal power and a relatively short time to be bridged as an emergency power generator, the hydrogen tank 10 can also be designed as a pressure reservoir. The hydrogen tank 10 is generally arranged in a non-pressurized but adequately ventilated region of the aircraft.

In one example, the fuel cell 2 may be designed as a polymer electrolyte membrane fuel-cell (also known as "PEMFC"), which operates in a moderate temperature range with operating temperatures of from about 60° C. to about 120° C. and is thus generally suitable for use in vehicles. As an alternative to this, the use of solid-oxide fuel cells would also be imaginable, which operate at a significantly higher temperature level of from about 650° C. to about 1000° C. However, the present disclosure is not to be limited to the use of a single fuel cell type. Instead, it makes sense to also consider other alternatives, depending on the concrete design of the vehicle.

As an alternative to the hydrogen tank 10 shown, a reformer may also be used that is designed to generate a hydrogen-containing gas from hydrocarbons, for example kerosene. To this effect in principle a number of different methods are known, for example steam reforming, partial oxidation or autothermal reforming. However, these are not shown in detail below. If solid-oxide fuel cells were to be used, with a particular material composition they could themselves act as a reformer and could, depending on the available hydrocarbon source, be supplemented by a pre-reformer.

The air source 8 is designed, by way of the oxidant supply unit 5, to supply air containing oxygen to the fuel cell 2. This air may originate from a passenger cabin, from an engine in the form of bleed air, or from the surroundings of the transportation means, and, if required, may be conveyed to the fuel cell by way of a conveying device, for example a fan, a pump or a ram air duct, which conveying device is arranged in the oxidant supply unit 5 or outside the aforesaid. Generally, the air from the air source 8 has been conditioned in such a manner that it may be conveyed to the fuel cell 2 without any further measures. This includes, among other things, a suitable temperature, adequate pressure and, in one example, with the use of a PEMFC, suitable relative atmospheric humidity in order to protect the membrane of the fuel cell 2. As an alternative, the fuel cell may also be moistened by way of a corresponding use of the water generated.

The purpose of the oxidant supply unit 5 comprising the oxygen valve 4 comprises, in the case of an emergency of the transportation means, supplying the fuel cell 2 with oxygen substantially exclusively from the oxygen tank 6. The emergency supply system is switched to the operating state of an emergency power generator, which in a completely autarchic manner provides electrical power. To this effect, if several hydrogen sources under consideration are used, the hydrogen tank 10 may be desirable because operation of a reformer usually depends on additional operating materials.

In order to switch the emergency supply system to the operating mode of a fire extinguishing system, the oxygen valve 4 is switched to the supply of air to the fuel cell 2 so that after a significant part of the atmospheric oxygen contained therein has been consumed almost exclusively nitrogen arises, as exhaust air, from the fuel cell, which results in a particularly good inertization ability or extinguishing effect.

In the operation of the fuel cell 2, almost inevitably electrical power is provided that is conveyed by way of a corresponding line 12 into one or several electrical networks E1 and E2. Merely as an example a converter 14 is shown that adapts the direct current supplied by the fuel cell 2 to voltages and frequencies that are usual on board a transportation means. During the operating mode as an emergency power generator, as a matter of course the electrical power provided is taken up by the substantial systems of the transportation means. As a result of the adequate supply of educts to the fuel cell 2 the adequate electrical power output is made possible. In the converse case, i.e. in the operating mode as a fire extinguishing device, processing of the educts needs to be ensured by an adequate power drain. This may be achieved by relieving primary sources of electricity, for example generators, or by means of blind loads.

As a further product of the fuel cell process when taking up air from the air source 8, to a large extent oxygen-depleted exhaust air arises that is conveyed, by way of an exhaust air outlet 16, to a first extinguishing agent inlet 17 of an extinguishing-agent supply unit 7 that comprises an extinguishing-agent valve 18. Said extinguishing-agent valve 18 is, for example, in fluidic connection with a front cargo compartment 20 and a rear cargo compartment 22 of the transportation means so that by means of opening the extinguishing-agent valve 18 air that is largely oxygen-depleted may be supplied to one or both of the cargo compartments 20 and 22.

This results in the displacement of the existing air that contains oxygen, and consequently the cargo compartments 20 and 22 are inertized. Continuous inertization can prevent a fire from arising in one of the cargo compartments 20, 22, while inertization on demand may inhibit a fire by suffocating it.

Figure 2A:
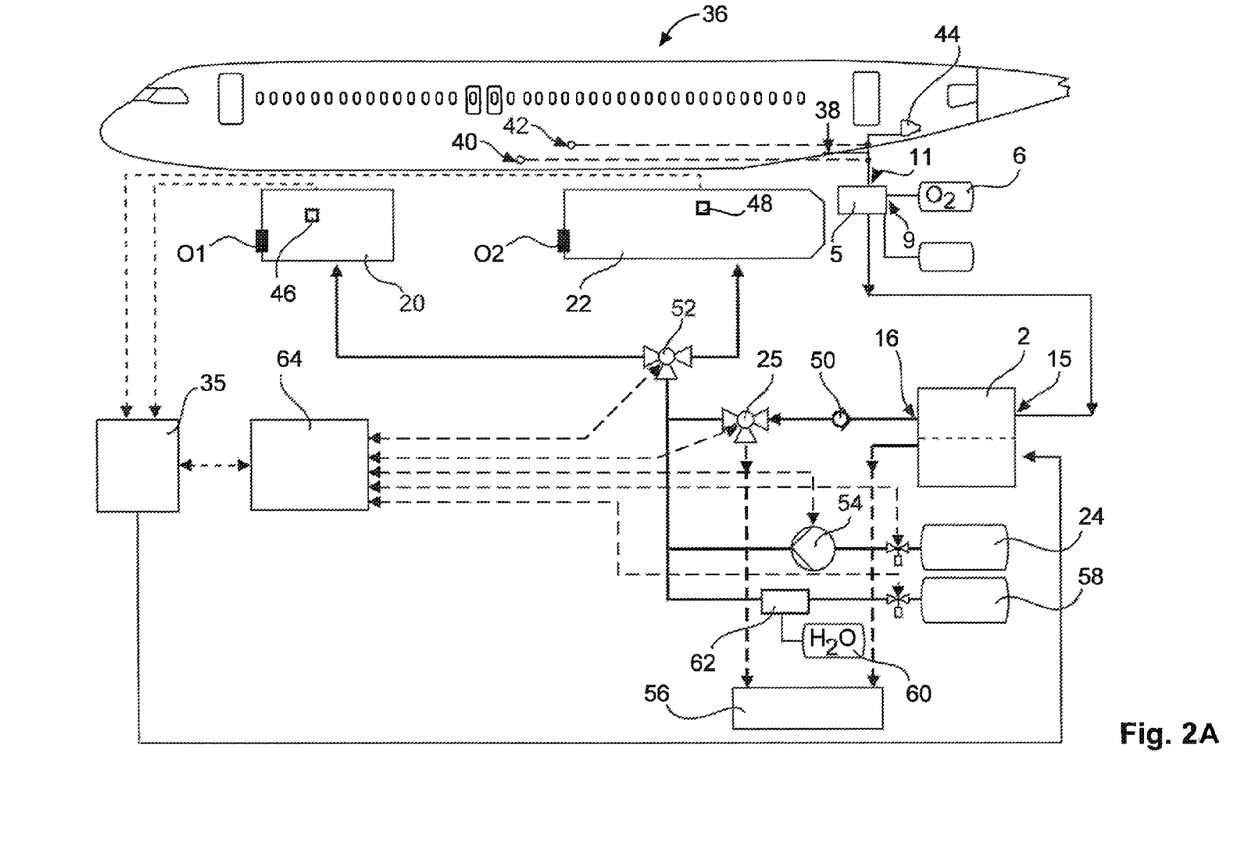
FIGS. 2A to 2D show further diagrammatic views and details of the emergency supply system.
Figure 2B:
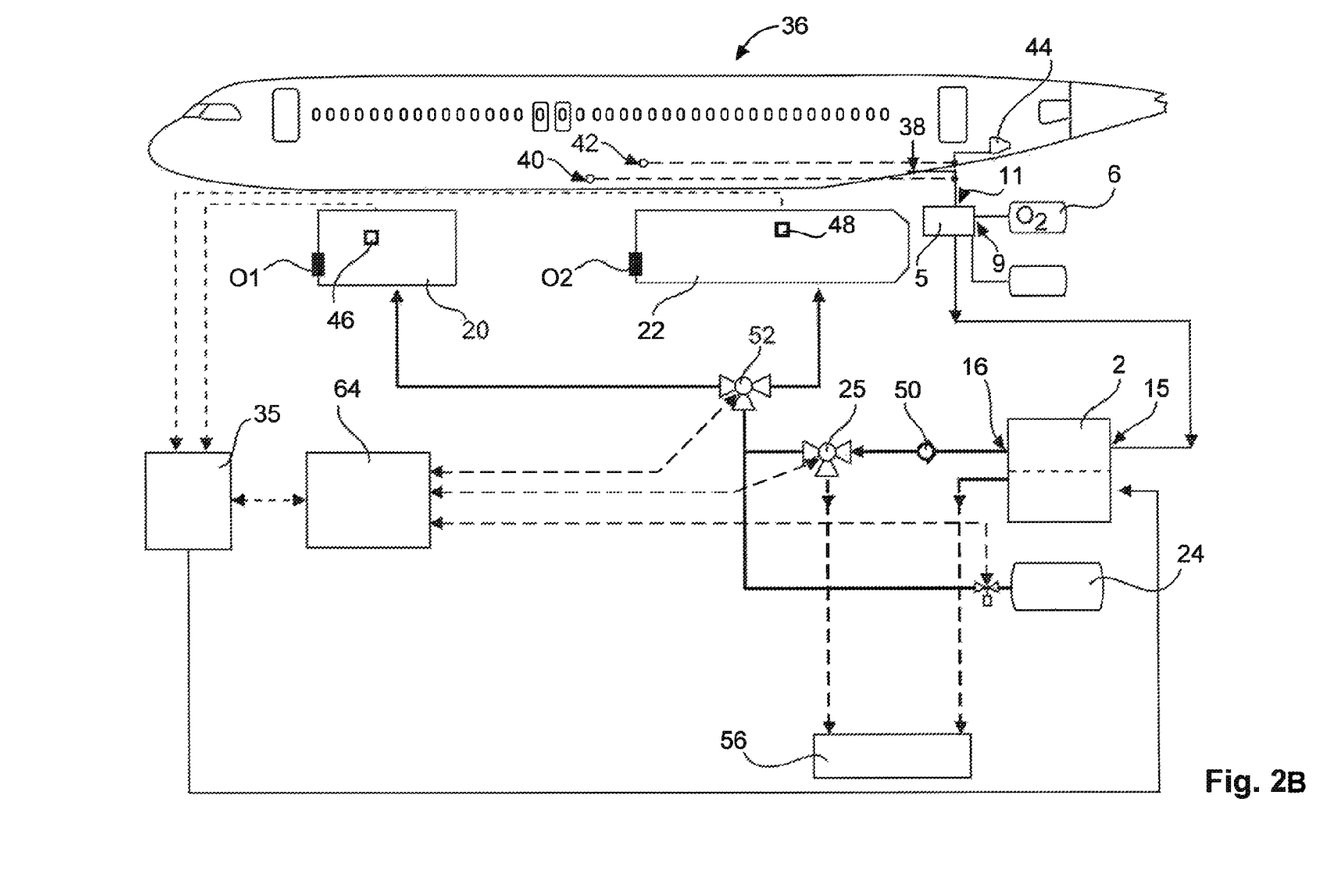

In addition to the above there is an extinguishing agent source 24 that is also connected, by way of a second extinguishing agent inlet 19, to the extinguishing-agent valve 18. In this way it is possible in a targeted manner to introduce extinguishing agent from the extinguishing agent source 24 by way of extinguishing agent outlets 21 and 23 to one or both of the cargo compartments 20 and 22. It should be pointed out that the extinguishing-agent supply unit 7 may also have further extinguishing agent outlets. As an alternative or in addition the use of a distributor valve is also possible that can distribute an extinguishing-agent flow to several spaces as shown in FIGS. 2A and 2B. In this arrangement the distribution valve may be an integral part of the extinguishing-agent supply unit 7, or it may be constructed separately thereof. Separate construction makes sense, for example, if the spaces under consideration are situated at some distance from the emergency supply system. The extinguishing agent may generally be provided in the form of an inert gas, wherein carbon dioxide, nitrogen or, for example, argon are to be considered. The use of carbon dioxide is associated with an advantage in that it opens up the possibility of pressure liquefaction with high-pressure bottles, or alternatively liquefaction at moderate cooling temperatures, approximately of −20° C., which makes possible the storage in low-pressure bottles. In addition or as an alternative, it makes sense to use nebulized water that may be generated by means of an inert gas, a gaseous extinguishing agent or a propellant gas. The water being used may comprise a surfactant or a foaming agent in order to reduce the surface tension for improved penetration of the extinguishing agent into a burning object; a gelling agent for improving the adhesion properties of the water; or salts for increasing the boiling point of the water.

In order to, in the operating mode of the emergency power generator, prevent any unused oxygen from the oxygen tank 6 from reaching one of the cargo compartments 20 and 22 by way of the fuel cell 2, an outlet valve 25 is provided that is adapted for conveying all the products from operation of the fuel cell 2 by way of an outlet opening from aboard the transportation means. The outlet valve 25 may be integrated in the extinguishing-agent supply unit 7, because the latter is in direct communication with the fuel cell 2. Generally, the outlet valve 25 is a three-way control valve that closes or opens a connection to the cargo compartments 20, 22, while at the same time a connection to an outlet opening of the transportation means is opened or closed.

For cooling the at least one fuel cell 2 a coolant circuit 26 is provided which, for example by means of circulation of a liquid coolant in a cooling pipe 28, ensures adequate heat removal by way of a pump 30, a radiator 32 and a ventilator 3.

A control unit 35, shown as a block in FIG. 1, which control unit 35 is connected to the valves of the oxidant supply unit 5 and of the extinguishing-agent supply unit 7 of the emergency supply system, is designed, depending on the resulting situation, to initiate an emergency electricity supply or fire extinguishing action. In order to assess a given situation the control unit 35 may be connected to fire sensors, smoke sensors or temperature sensors (not shown in detail), as an alternative or in addition also to signal sources from a cockpit of the transportation means.

FIG. 2A shows a transportation means 36 which, as an example, is shown as an aircraft. The oxidant supply unit 5 is connected to a cabin air connection 38, a bleed air connection 40, a fresh-air line 42 or a ram air inlet 44. These connections or pipes are to be considered merely as examples of sources of conditioned air that allow proper operation of the fuel cell 2.

In cargo compartments 20 and 22, fire detectors or smoke detectors 46 and 48 are arranged which are, as an example, coupled to a bus or a network by way of an interface 64, and which, if a fire or smoke arises, emit a corresponding signal. This signal may be conveyed directly to the control unit 35 that switches the emergency supply system to a fire extinguishing mode and initiates operation. As an alternative or in addition, the signal may also be conveyed to the cockpit of the transportation means in order to leave it to the person responsible to make a decision about operating the emergency supply system.

In the operating mode of the fire extinguishing device, oxygen-depleted exhaust air is discharged from the exhaust air outlet 16 and is generally conveyed, by way of a non-return valve 50, to the outlet valve 25, which in this operating mode is set to convey the oxygen-depleted exhaust air to the corresponding cargo compartment 20 or 22. Merely as an example, in this design a distribution valve 52 is arranged that correspondingly forwards the flow of oxygen-depleted exhaust air, for example only to the cargo compartment 20, only to the cargo compartment 22 or, at a ratio determined by the size of the cargo compartments relative to each other, to both cargo compartments 20 and 22. In order to support the extinguishing effect, an alternative extinguishing agent from an extinguishing agent tank 24 can also be conveyed to the distribution valve 52 by way of a pump 54.

If the operating mode is directed to an emergency power generator, the oxidant supply unit 5 is set in such a manner that oxygen is removed from an oxygen tank 6. In this case only water and residual oxygen are present at the exhaust air outlet 16 of the fuel cell 2, with said water and residual oxygen having to be conveyed, by way of the outlet valve 25, to an outlet opening 56. The same applies to a flow of residual fuel that flows from a residual-fuel outlet 57 of the fuel cell 2 to the outlet opening 56.

To further support an extinguishing process or inhibition process, by way of a propellant gas tank 58 water from a water tank 60 may be nebulized in nebulizing apparatus 62 and may be conveyed to the distribution valve 52. The water in the water tank 60 may temporarily at least partly be replenished by water arising from a fuel cell process of the fuel cell 2. As an alternative it would also be possible to arrange the nebulizing apparatus directly on or in the cargo compartments 20, 22 under consideration.

All the valves necessary for operating the system may be connected to the control unit 35 by way of the interface 64. The control unit 35 is equipped, when a signal is received, be it a signal from a smoke detector or from a fire detector 46, 48 in one of the cargo compartments or a signal from a pilot, to set one of the two possible operating modes.

FIG. 2B shows the emergency supply system of FIG. 2A, which, however, does not feature water nebulizing apparatus 62 or a pump 54 for the extinguishing agent from the extinguishing agent tank 24.

Figure 2C:
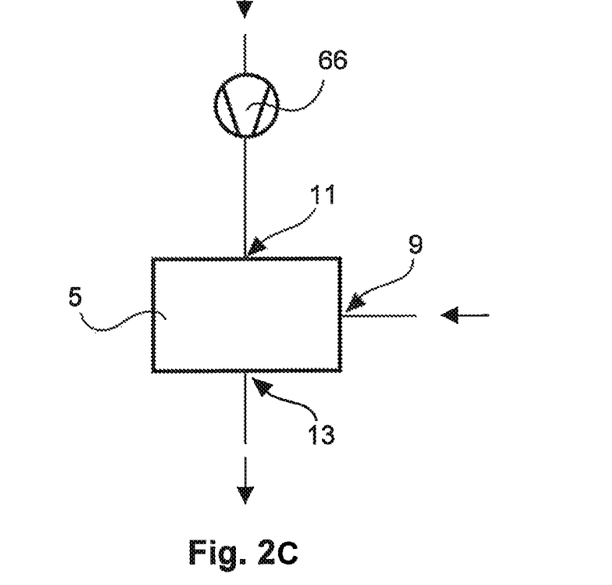

In order to achieve a particular operating pressure in the operating mode as a fire extinguishing device, air from an air source can be compressed, by way of a compressor 66, to conditioned supply air, as shown in FIG. 2C.

Figure 2D:
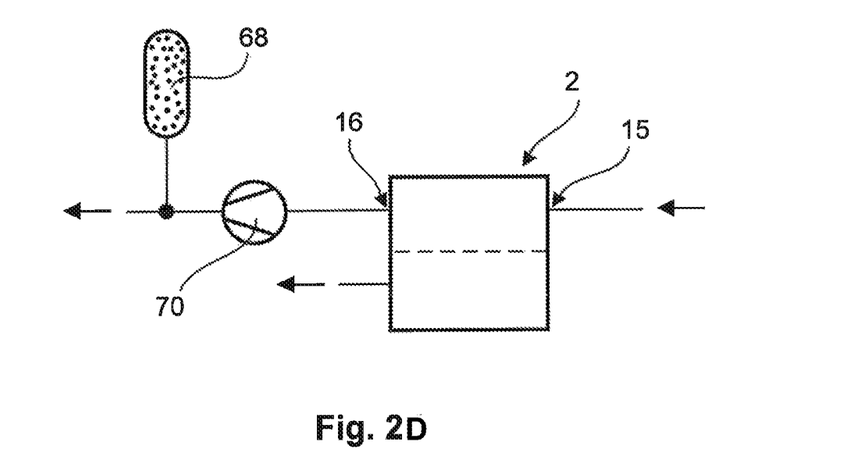

As shown in FIG. 2D, a buffer storage device 68 may be used that may receive oxygen-depleted exhaust air from the fuel cell 2, wherein the exhaust air is, for example, pressurized by way of a compressor 70. This may be advantageous if at first extinguishing takes place exclusively by means of an extinguishing agent, while the fuel cell 2 is in the process of starting up and providing a first quantity of oxygen-depleted exhaust air.

Figure 3:
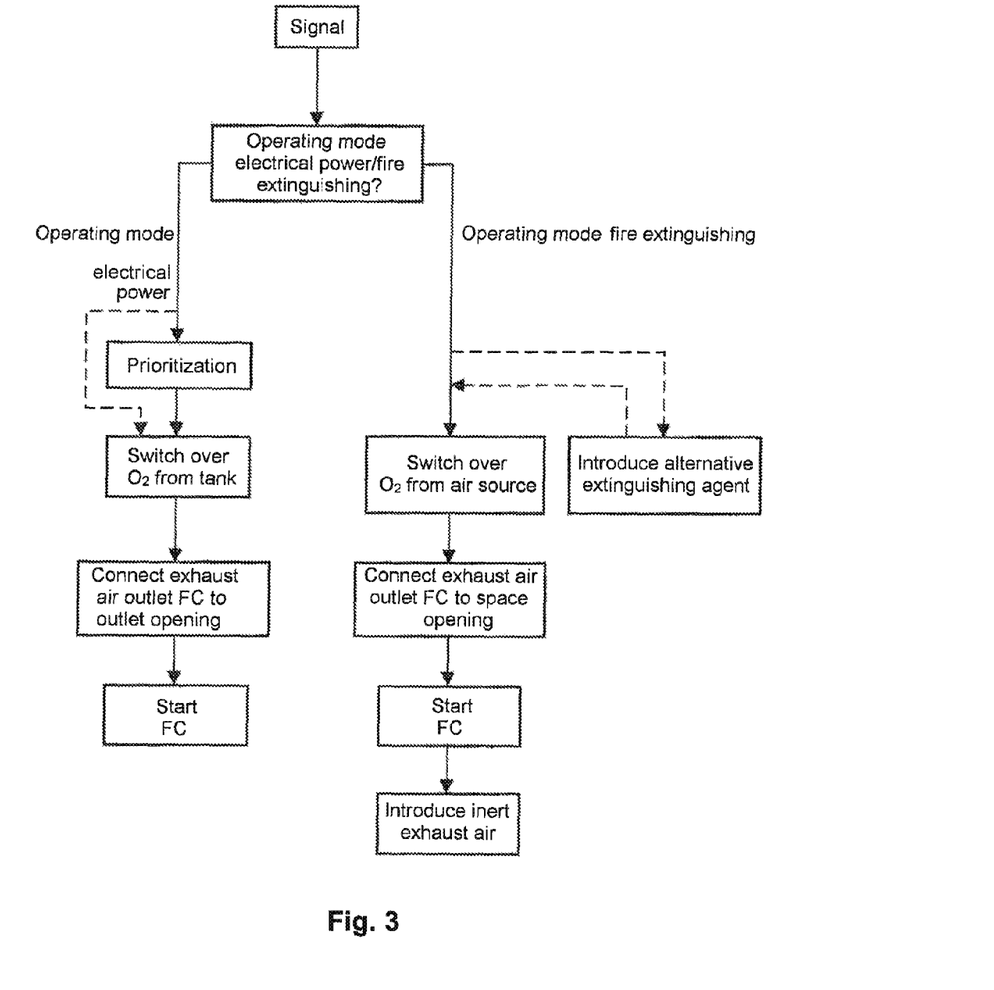
FIG. 3 shows a logic diagram for explaining the switchover of the system between two operating modes.

FIG. 3 shows a logic diagram according to which a control unit controls an emergency supply system as stated above. To save space, the term "fuel cell" has been abbreviated to "FC". In principle, two event-triggering situations are imaginable, namely the presence of an emergency due to insufficient supply of electrical power, and the presence of a fire signal or a smoke signal.

In the first case of insufficient supply of electrical power being present, for example due to an issue with an engine and the associated absence of the supply of electrical power from integrated starter generators, it is necessary to provide an alternative source of electrical power so as to relieve the on-board batteries. Firstly, a prioritization function can be run for the purpose of saving electrical power, in which function consumers that are not system-relevant are switched off or switched over to emergency operation. For example, in the case of an issue with an engine it is not essential to present the full on-board entertainment program to all passengers, and consequently this represents a savings potential. The same applies to generally energy-intensive electrical equipment in galleys, which equipment does not have to be operated during such an emergency. Subsequently to, or concurrently with, carrying out the prioritization function, the emergency supply system is switched to the operating mode of the emergency power generator. This results in the fuel cell system being started up, which when this emergency has arisen takes place with the supply of oxygen and hydrogen from dedicated tanks. The water generated in this process, together with a residual quantity of oxygen, is to be conveyed from the transportation means to the outside. By means of the supply of electrical power provided in this manner an emergency landing may be initiated and carried out.

In another situation it is possible, for example, for a signal from a fire detector or a smoke detector installed in a cargo compartment of the transportation means to be present. The fuel cell system is generally started substantially immediately after such a signal has been received, and the emergency supply system is switched to the operating mode of the fire extinguishing device. To ensure the fastest possible fire fighting and fire suppression action, immediately after receipt of the signal, extinguishing agent may be dispensed from an extinguishing agent tank. The exhaust air outlet 16 is switched, by means of a corresponding valve switch arrangement, to the affected cargo compartment. As an alternative, during an initial knock-down phase it is also possible for the oxygen-depleted exhaust air that already arises during operation of the fuel cell system to be stored in a buffer tank, for example supported by a compressor. When filling or the inertization of the particular cargo space with extinguishing agent has been completed, the supply of extinguishing agent can be interrupted, and subsequently the introduction of oxygen-depleted exhaust air may be carried out. If at first an extinguishing agent is introduced, there is already an adequately inert atmosphere in order to stop the fire from spreading or starting again. However, it should be remembered that usually it is impossible to achieve a hermetic seal in a cargo compartment of a transportation means, so that in one example, in pressurized fuselages of a transportation means leakage is to be expected due to ingress from an adjacent cabin, and the resulting induced egress through a seal of a cargo compartment door or possibly the exhaust air valves O1 and O2. In order to compensate for this leakage, oxygen-depleted exhaust air from the fuel cell system is introduced into the relevant cargo compartment. In this case it is not necessary to precisely measure the leakage; instead, based on the constant inflow of inert gas in the form of oxygen-depleted exhaust air it can be assured that the oxygen concentration remains at a continuously low level. Setting an adequate volume flow of oxygen-depleted exhaust air to cover a leakage that is known in principle is adequate to bring about reliable suppression of fires.

Since a fuel cell only generates the waste product of oxygen-depleted exhaust air if there is an effective electrical current, it must be ensured that an adequate current is set for dimensioning the fuel cell. This may be achieved either by supplying the electrical power to an electrical network on board the transportation means, or, as an alternative, by means of a blind load that merely converts electrical power to heat. In one example, in the use of the emergency supply system according to the present disclosure on board an aircraft, the heat may, for example, be given off by way of an exterior-skin heat exchanger or by way of release to cabin air and/or to cargo compartment air.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An emergency supply system for a transportation means, comprising:
    at least one fuel cell having an oxidant inlet and an exhaust air outlet;
    a hydrogen tank;
    an oxygen tank;
    an extinguishing agent container;
    an oxidant supply unit that includes an oxygen inlet that is connectable to the oxygen tank, an air inlet that is connectable to an air source, and an oxidant outlet that is connected to the oxidant inlet of the at least one fuel cell, the oxidant supply unit operable in a first operating mode of the emergency supply system as an emergency power generator for conveying oxygen from the oxygen inlet, and in a second operating mode as a fire extinguishing device for conveying air from the air inlet to the oxidant outlet; and
    an extinguishing-agent supply unit that includes a first extinguishing agent inlet, a second extinguishing agent inlet connected to the extinguishing agent container, and at least one extinguishing agent outlet that is connectable to at least one extinguishing agent inlet of at least one space of the transportation means,
    wherein the extinguishing-agent supply unit is operable in the first operating mode to connect the exhaust air outlet of the at least one fuel cell exclusively to an outlet opening and in the second operating mode to connect the exhaust air outlet of the at least one fuel cell exclusively to the first extinguishing agent inlet.

2. The emergency supply system of claim 1, wherein the air inlet of the oxidant supply unit is connected to a cabin exhaust-air connection of the transportation means.

3. The emergency supply system of claim 1, wherein the air inlet of the oxidant supply unit is connected to at least one bleed air source of the transportation means.

4. The emergency supply system of claim 1, wherein the air inlet of the oxidant supply unit is connected to a fresh-air supply line of an air conditioning system of the transportation means.

5. The emergency supply system claim 1, further comprising a control unit that is connected to the at least one fuel cell, to the oxidant supply unit and to the extinguishing-agent supply unit,
wherein the control unit is designed when receiving a signal to substantially immediately initiate operation of the at least one fuel cell, and initiate the connections of the oxidant supply unit and of the extinguishing-agent supply unit, which are necessary to the respective first operating mode and second operating mode of the emergency supply system.

6. The emergency supply system of claim 5, wherein the control unit, in the second operating mode substantially immediately causes a first quantity of an extinguishing agent by way of the extinguishing-agent supply unit to flow from the extinguishing agent container to the extinguishing agent outlet so as to quickly suffocate a fire.

7. The emergency supply system of claim 1, further comprising a compressor, arranged on the air inlet of the oxidant supply unit, for compressing air from the air source.

8. The emergency supply system of claim 1, further comprising a water source that is connected to nebulizing apparatus,
wherein the nebulizing apparatus conveys nebulized water into the at least one space of the transportation means.

9. The emergency supply system of claim 8, wherein the nebulizing apparatus is connected to a propellant gas tank for introducing propellant gas for nebulizing water.

10. The emergency supply system of claim 8, wherein the nebulizing apparatus is connected to the at least one extinguishing agent outlet for introducing gaseous extinguishing agent for nebulizing water.

11. The emergency supply system of claim 8, wherein the nebulizing apparatus supplies nebulized water between the at least one extinguishing agent outlet and the at least one extinguishing agent inlet of at least one space to an extinguishing agent pipe.

12. The emergency supply system of claim 1, further comprising a buffer storage device at the exhaust air outlet of the at least one fuel cell.

13. The emergency supply system of claim 1, wherein the extinguishing-agent supply unit at substantially the same time conveys the extinguishing agent from the extinguishing agent tank and conveys oxygen-depleted air from the exhaust air outlet of the at least one fuel cell into the at least one space.

14. A transportation means, comprising:
a fuselage having at least one space defined therein; and
an emergency supply system having a first operating mode and a second operating mode, the emergency supply system including at least one fuel cell having an oxidant inlet, a hydrogen tank, an oxygen tank, an oxidant supply unit that includes an oxygen inlet that is connectable to the oxygen tank, an air inlet that is connectable to an air source, and an oxidant outlet that is connected to the oxidant inlet of the at least one fuel cell, the oxidant supply unit operable in the first operating mode as an emergency power generator that conveys oxygen from the oxygen inlet, and in the second operating mode as a fire extinguishing device that conveys air from the air inlet to the oxidant outlet.

15. The transportation means of claim 14, further comprising an extinguishing agent container and an extinguishing-agent supply unit that includes a first extinguishing agent inlet, a second extinguishing agent inlet connected to the extinguishing agent container, and at least one extinguishing agent outlet that is connectable to an extinguishing agent inlet of at least one space of the transportation means,
wherein the extinguishing-agent supply unit is operable in the first operating mode to connect an exhaust air outlet of the at least one fuel cell exclusively to an outlet opening and in the second operating mode to connect the exhaust air outlet of the at least one fuel cell exclusively to the first extinguishing agent inlet.

16. The transportation means of claim 15, further comprising a control unit that is connected to the at least one fuel cell, to the oxidant supply unit and to the extinguishing-agent supply unit,
wherein the control unit receives a signal to initiate operation of the at least one fuel cell, and initiates the connections of the oxidant supply unit and of the extinguishing-agent supply unit, which are necessary to the respective first operating mode or second operating mode of the emergency supply system.

17. The transportation means of claim 16, wherein the control unit, in the second operating mode substantially immediately causes a first quantity of an extinguishing agent by way of the extinguishing-agent supply unit to flow from the extinguishing agent container to the extinguishing agent outlet so as to quickly suffocate a fire.

18. The transportation means of claim 14, further comprising a compressor, arranged on the air inlet of the oxidant supply unit, for compressing air from the air source.

19. The transportation means of claim 14, wherein the transportation means is an aircraft.

20. A method for supplying electrical power and for inhibiting fire in a transportation means, in which method an emergency supply system with a fuel cell is switchable into one of two operating states, wherein the first operating state is intended to provide electrical power and the method for switching into the first operating state comprises:
switching-over an oxidant supply unit for supplying the fuel cell with oxygen from an oxygen tank;
connecting the fuel cell to an outlet opening of the transportation means;
starting the fuel cell; and
wherein the second operating state is intended for inhibiting a fire in a space of the transportation means and the method for switching into the second operating state comprises:
switching-over an oxidant supply unit for supplying the fuel cell with air from an air source;
connecting an extinguishing agent inlet to an exhaust air outlet of the fuel cell;
starting the fuel cell; and
introducing inert exhaust air into the space.

* * * * *